(12) United States Patent
Boldt

(10) Patent No.: US 6,207,742 B1
(45) Date of Patent: *Mar. 27, 2001

(54) WATER-BASED MARKER MATERIAL

(75) Inventor: Peter-Christian Boldt, Denzligen (DE)

(73) Assignee: Rohm and Haas Company, Philadelphia, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,501

(22) PCT Filed: May 2, 1996

(86) PCT No.: PCT/CH96/00043

§ 371 Date: Jul. 30, 1997

§ 102(e) Date: Jul. 30, 1997

(87) PCT Pub. No.: WO96/24640

PCT Pub. Date: Aug. 15, 1996

(30) Foreign Application Priority Data

Feb. 8, 1995 (CH) .................................................. 361/95

(51) Int. Cl.$^7$ .................................................. C08K 3/40
(52) U.S. Cl. .................. 524/494; 523/172; 523/212; 523/214; 524/492; 524/493; 524/556; 524/560; 427/137; 427/421; 427/426; 427/447
(58) Field of Search .................... 524/492, 493, 524/494; 523/172, 212, 214

(56) References Cited

U.S. PATENT DOCUMENTS

| | | | | |
|---|---|---|---|---|
| 4,128,695 | * | 12/1978 | Kikuchi et al. | 428/423 |
| 4,740,536 | * | 4/1988 | Chao | 523/406 |
| 4,812,493 | * | 3/1989 | Cummings | 523/412 |
| 4,839,198 | * | 6/1989 | Lonis et al. | 523/172 |
| 5,322,865 | * | 6/1994 | Inoue et al. | 523/501 |
| 5,340,870 | * | 8/1994 | Clinnin et al. | 523/172 |
| 5,356,956 | * | 10/1994 | Uemae et al. | 524/494 |
| 5,385,968 | * | 1/1995 | Bowman et al. | 524/494 |
| 5,527,853 | * | 6/1996 | Landy et al. | 524/521 |
| 5,804,627 | * | 9/1998 | Landy et al. | 524/314 |

FOREIGN PATENT DOCUMENTS

| | | |
|---|---|---|
| 18 17 066 | 6/1970 | (DE). |
| 42 44 665 A1 | 11/1993 | (DE). |
| 0 409 459 | 7/1990 | (EP). |
| 0322 188 B1 | 10/1992 | (EP). |
| 2 255 099 | 10/1992 | (GB). |

OTHER PUBLICATIONS

International Search Report listing cited references.

* cited by examiner

Primary Examiner—Judy M. Reddick

(57) ABSTRACT

A two-component aqueous composition for thick horizontal markings on roads or other traffic areas is disclosed. One component includes a drying-accelerated binder, pigments, pulverulent fillers and additives, while the other component includes coarse fillers. The composition is very high solids and fast drying without the cracking, smearing, and dirt adhesion typical of thick film traffic markings.

14 Claims, No Drawings

WATER-BASED MARKER MATERIAL

The invention relates to an aqueous marking composition for horizontal markings on roads or other traffic areas, which comprises a drying-accelerated binder on the basis of an anionically stabilized emulsion polymer, and color pigments and also fillers. Furthermore, the invention relates to processes for preparing such an aqueous marking composition.

By the expression "drying-accelerated binders" used here there are understood polymer preparations which through an integrated physico-chemical mechanism ensure that marking compositions prepared with such binders dry substantially more rapidly after they have been laid than do marking compositions comprising a conventional binder. Only through this accelerated drying can these marking compositions be employed in a suitable manner in traffic engineering, since long, traffic-hindering road closures caused by long drying times can be done away with.

[Known drying-accelerated binders of this kind, which are intended above all for horizontal marking on roads, are described for example in particular in EP-B-0 322 188 and EP-A-0 409 459 and] Drying-accelerated binders of this kind are well known in the art. Landy et al. (EP 0 409 459 A) disclose fast-drying binder systems that are aqueous coating compositions containing anionically stabilized emulsion polymer having a Tg greater than about 0° C., an effective amount of polyfunctional amine and a volatile base in an amount effective to raise the pH of the composition to a point high enough for the polyfunctional amine to be essentially in a non-ionized state (deprotonation) thereby eliminating polyamine interaction with the anionically stabilized emulsion and anionic ingredients in the coating. The anionic stabilization of the emulsion polymer is accomplished either through addition of anionic stabilizers (e.g., surfactants) to the dispersion or through incorporation of anionic moieties on the polymeric backbone of the emulsion polymer. Such anionic moieties include, for example, carboxylic acid groups. When these fast drying aqueous coating compositions are applied to a surface as a thin layer, the volatile amine evaporates rapidly. The rapid loss of amine allows protonation of the polyfunctional amine. The protonated polyfunctional amine then rapidly interacts with the anionic stabilizer, forming ion pairs that destabilize the aqueous dispersion to cause rapid film formation.

Chou et al. (EP 0 322 188 B) disclose a drying-accelerated binder system for scavenging anionic species during film formation. The anionic species present in the aqueous dispersion prior to film formation are scavenged and sequestered into the discontinuous phase of the film, thus rendering the film less susceptible to attack by moisture. The aqueous coating composition of Chou includes latex particles of polymers containing weak base-functional groups, such as tertiary amines. Also included in the aqueous coating composition is a volatile base (for example ammonia or amines) adapted to maintain the pH of the aqueous coating composition above the pKa of the weak base-functional groups prior to and during the application of the composition. Once a thin layer of the aqueous coating composition has been applied to a surface, the volatile amine evaporates, allowing protonation of the weak base moieties. The protonated weak base moieties then form ion pairs with the anionic species, effectively sequestering them.

The invention of Chou et al. includes mixed aqueous compositions containing both weak base-functional polymer particles and binder-forming polymer latex particles. Often the binder-forming latex polymer particles contain carboxyl functional groups. Under suitable conditions, the carboxyl groups are ionized and the resultant charges on the latex particle surface electrostatically stabilize the latex against premature agglomeration. Often a volatile base is used to adjust the pH of the composition. When the composition is applied to a substrate, the volatile base is lost and the pH of the composition drops, destabilizing the latex particles of the binder and thus encouraging agglomeration to form a continuous binder film. When weak base-functional latex particles (i.e., polyfunctional amines) are included in such compositions, the weak base becomes protonated as the pH drops when the volatile base is lost. Subsequently, anionic species such as anionic surfactant are believed to diffuse to and to form ion pairs with the protonated weak base.

Drying-accelerated binders of the kind above described are for example currently obtainable commercially as customary commercial products of the company ROHM and HAAS, Philadelphia, Pa., USA, under the trade marks FASTRACK® 2706 aqueous binder and PRIMAL® 3031 aqueous binder.

To achieve the accelerated drying these known polymer preparations consist of water-insoluble, anionically stabilized plastics polymer particles and a polyfunctional water-insoluble or water-soluble amine. These two constituents are preferably incompatible with one another and are unable, given a sufficiently high pH value, to react. If, however, the pH value of the preparation falls below a particular value, then a physico-chemical reaction of the binder components ensues, leading to drying. The initially stabilizing high pH value is obtained by addition of a volatile base, preferably amonia. If the pH value of a paint formulation on the basis of such a binder falls below a particular value through evaporation of the volatile base, then the marking composition solidifies or dries very rapidly, and in fact relatively independently of the external climatic conditions and also of the layer thickness.

However, marking compositions which comprise known, drying-accelerated binders as described in the documents mentioned and such as, in particular, for example the above-mentioned PRIMAL 2706 binder, and also a conventional appropriate combination of solid inorganic particles such as color pigments, customary additives and fillers, have to date been prepared and tested only in the form of a sprayable marking paint with a proportion of volatile substances of at least 20%, and these sprayable marking paints have to date exclusively been able to be used for the preparation of markings whose layer thickness was less than 1 mm. Thus, for example, the trials described in EP-A-0 409 459 with the drying-accelerated binder relate to wet film thicknesses of about 0.3 mm and to dry film thicknesses of 0.09 mm. The reason for this lies in the fact that the paint formulations known to date, which to obtain a rapid drying speed as required for traffic engineering are based on a drying-accelerated binder, exhibit severe cracking even at layer thicknesses of less than one millimeter and have surface defects which considerably impair their quality.

For horizontal markings with layer thicknesses of at least on millimeter, as are frequently required, the rapidly drying marking compositions known to date are therefore unsuitable.

The thick-layer markings which have layer thicknesses of approximately 1 to 3 mm are laid predominantly, owing to their high viscosity, by the so-called drawing shoe method. In the case of works such as the preparation of direction arrows it is also possible to work with the filling knife. In accordance with other application techniques small piles of up to 3 mm in height are thrown onto the marking line by a kind of sling, for example, and in this way a profiled road marking with enhanced night visibility in the wet is obtained. Furthermore, various other application techniques are known for preparing profiled markings having very different profile forms. For thick-layer markings use is made very frequently of two-component systems in which polymeric methacrylates serve as binders. The material is cured by mixing the composition with peroxides, whereby polymerization of the material is brought about. The drying times of these two-component marking compositions are in general between 20 and 35 minutes. Processing is laborious and, once combined with peroxide, compositions must be used up within from 20 to 30 minutes.

In addition, use has also been made hitherto, for thick-layer markings, of thermoplastic compositions in which plastics which can be melted at relatively high temperatures act as binders. To melt the thermoplastic compositions the latter must be heated up on the road for a number of hours before processing, in order to produce the working viscosity. In the course of processing it is likewise necessary to maintain a continual supply of energy with special machines in order that the marking composition can be laid. The dry times, however, are extremely short, since in order to cure the material just cools down. With the laborious processing, the consumption of primary energy is also very high.

The possibility of employing, in a substantially more economic manner, water-thinnable thick-layer marking compositions in accordance with the current state of the art is almost completely ruled out owing to the extremely long drying times when using conventional binders which have not been drying-accelerated and is almost completely ruled out owing to the unacceptable cracking in the material when using the drying-accelerated binder mentioned.

The present invention is based on the object of producing—using known, drying-accelerated binders, especially the binders mentioned that are obtainable under the trade mark FASTRACK® from Rohm and Haas Company, Philadelphia, Pa., and utilizing the integrated drying mechanism inherent in these binders—water-thinnable marking compositions for thick layers of about 1 to 3 mm in thickness, whose usefulness and serviceability is in no way impaired by surface defects or cracks or thrown into doubt by excessively long drying times.

This object is achieved by an aqueous marking composition in accordance with the precharacterizing clause of claim 1 having the features indicated in the characterizing part of this claim 1.

This marking composition therefore has an unusually high solids content, especially in terms of coarse fillers, and therefore has only a lower proportion of binder and, consequently, of volatile substances than usually present in the sprayable marking paints. As is known, the customary binders in the form of aqueous dispersions and the drying-accelerated binder specified here comprise about 50% of volatile substances, predominantly water, so that the marking composition according to the invention, taking into account the low proportion of other volatile substances in the additives, comprises only about 7 to 13% by weight of volatile components.

It has surprisingly become evident that, in the case of such a marking composition, cracking is totally avoided even at a layer thickness of 3 mm and no defects can be perceived even when the laid marking is viewed at 15 times optical magnification, and that, in contrast to marking compositions formulated with conventional binders, the drying times are very short (15 to 30 minutes) on account of the but small proportion of volatile substances.

The low-viscosity paint component, which makes up 40 to 60% by weight of the marking composition, consists of a known, drying-accelerated binder, color pigments, some customary additives and fine, pulverulent fillers with a maximum average grain diameter of 0.03 mm, as described for example in EP-A-0 409 459 and EP-B-0 322 188. This low-viscosity component constitutes a sprayable composition. The remaining proportions by weight consist of coarse fillers whose particle diameter is at least 0.1 mm, preferably 0.1 to 0.7 mm.

The preparation of the low-viscosity paint component takes place in accordance with the state of the art and with the known instructions for preparing aqueous emulsion paints.

The marking compositions described below, which were tested as examples and for which the test results are indicated in Tables 1 and 2 (page 11), contained a low-viscosity paint component of 50% by weight and also a mixture of coarse fillers, this filler mixture being referred to below as "anti-cracking filler", abbreviated to AC filler.

The low-viscosity paint component was composed as follows, the stated percentages by weight relating to the finished marking composition:

The drying-accelerated binder used was the product already mentioned earlier, obtainable on the market under the trade mark FASTRACK® 2706 aqueous binder from Rohm and Haas Company, Philadelphia, Pa., in a proportion of 18% by weight. As white color pigments use was made of titanium dioxide in a proportion of 7% by weight. The pulverulent fillers consisted in the case of some samples of calcium carbonate, in the case of other samples of silicon dioxide, and in the case of further samples of a mixture of both, in a proportion of 23% by weight. All of these finely particulate fillers, whose particles have a maximum average grain diameter of 0.03 mm, gave virtually the same result. Finally, a customary mixture of additives was added, consisting of a dispersant, a wetting agent, a defoamer, a film-forming auxiliary and a small amount of a volatile alcohol; these components of additives are in addition to the other components of the marking composition and amount to about 2% by weight, based on 100% marking composition.

To form the finished marking composition, 50% by weight of the AC filler was added to these thus-prepared, low-viscosity paint components. The operation of making up the low-viscosity color component with the A.C. filler took place in accordance with the prior art and with the instructions for preparing viscous compositions.

The binder comprises, in approximately equal parts, solid and volatile substances, above all water. Similarly, the additives, such as dispersants and wetting agents, consist approximately of equal parts of solid and volatile substances. Since all remaining components consist of solids, the solids content of the tested samples is about 90% by weight.

Table 1 (page 11) shows, in rows 1 to 5, five different compositions of the AC filler, with which marking compositions were tested whose low-viscosity paint component was 50% by weight. In columns 1, 2 and 3 of Table 1 the various components of the AC filler used, in column 4 the drying time up to overdrivability, and in column 5 the result of a test for cracking, are indicated. The results of Table 1 relate to markings drawn onto cardboard with a so-called drawing shoe, having a layer thickness of 3 mm.

Rows 1 to 4 relate to AC fillers whose particles surfaces were not treated. Line 5 shows the result when using AC filler components having a surface treatment which consisted in a coating of the particles with an organosilane as adhesion promoter between the particles and the binder.

Line 6, finally, shows for comparison the result with a binder drying not in an accelerated form but conventionally. Color markings with customary compositions cannot be applied in these layer thicknesses, so that a comparison with them is not possible.

For the AC fillers use was made of customary glass beads or reflective beads with a diameter of from 100 to 250μ on the one hand and with a diameter of from 250 to 500μ on the other hand. The quartz sand used had the cristoballite structure and consisted of particles with a diameter of 100 to 400μ.

As Table 1 shows, a preferred composition of the AC filler comprising one third fine glass beads of 100 to 250μ in diameter, one third coarse glass beads of 250 to 500μ, and one third coarse quartz sand with particle diameters from 100 to 400μ, gives the shortest drying time. However, all other compositions of the AC filler also gave, according to Table 1, outstanding results, compared with the use of a conventionally drying binder (Table 1, row 6), with which it was necessary to accept a drying time which was two times to three times as long, of 71 minutes; these conventional binders are therefore not usable for thick-layer markings, since they cannot be applied in a traffic-appropriate manner. In no case were cracks observed.

The trials for measuring the drying time were conducted in a climatic chamber with gentle air movement, at constant temperature and air humidity. The marking compositions were applied in defined layer thickness on a cardboard substrate using a drawing shoe. Then the film was left to dry. A somewhat absorbent cardboard substrate simulates the more or less absorbent bitumen layer of a road better than, for example, a glass plate. The test for overdrivability was carried out by conducting, with the thumb and under gentle pressure, a rotary movement on the paint surface. When paint no longer adhered to the thumb, the coating was considered as drivable. 60 minutes after drying, the samples were immersed with the material in water for 10 minutes. If the coating could no longer be destroyed even by short, vigorous rubbing, then the paint was regarded as water-fast. This was the case with all samples.

As well as measurements on thick layers with a thickness of 3 mm, thick layers with a thickness of 1 mm and 2 mm were additionally tested, using respectively the same composition of the marking composition with the AC fillers indicated in Table 1. The results are indicated in Table 2, in which lines 1 to 6 relate to the AC filler compositions specified in lines 1 to 6 of Table 1, and columns 1, 2 and 3 indicate the drying times, in minutes, for thick layers of 1 mm, 2 mm and 3 mm. Drying was carried out at 20° C. and 70% air humidity. Application was made onto cardboard. All coatings in accordance with lines 1 to 5 proved to be water-fast 60 minutes after the drying time. In turn, the drying times of samples containing a conventional binder are 2 to 3 times as long as those of the samples according to the invention.

In general the compositions of the low-viscosity component can amount, based on the finished marking composition, to 12 to 24% by weight, preferably 15 to 20% by weight of binder, which consists to the extent of approximately half of solid substances, 6 to 9% by weight, preferably 7 to 8% by weight of color pigments, 20 to 27% by weight of pulverulent fillers and 1.6 to 2.4% by weight, preferably about 2% by weight of additives. In general, it is possible as pulverulent fillers to use, in particular, carbonates, silicates, talc or sulfates. The nature, purity and granularity of the fine fillers do indeed influence the properties of the low-viscosity paint component, the properties of the finished marking compositions, above all the drying time, but only slightly, so that there is no need to go into this in any more detail. What is critical is the solids content, which should be 87 to 93, preferably 89 to 91% by weight.

In general it is possible to use an AC filler comprising coarse-grained mineral and/or organic particles having a minimum grain diameter of 100μ. Specifically it is possible, for example, as further trials showed, to employ the following AC fillers with success:

glass beads with a diameter of 100 to 200μ;

glass beads with a diameter of 100 to 200μ mixed with glass beads which have a diameter of 100 to 700μ;

quartz sands and christoballites with a particle diameter of 100 to 400μ, mixed with glass beads with a diameter of 100 to 200μ;

quartz sands and christoballites with a particle diameter of 100 to 400μ, mixed with glass spheres with a diameter of 100 to 200μ and 100 to 700μ;

quartz sands and christoballites with a particle diameter of 100 to 400μ, mixed with glass beads and water-insoluble carbonates, sulfates or other mineral substances with a grain diameter of 100 to 400μ.

Suitable organic fillers are coarse granules of hard plastics, as are produced for example in aircraft manufacture, or other similar granules.

The resulting marking compositions with the AC fillers according to Table 1 are highly viscous and can be processed outstandingly with the methods customary for such systems. They have an excellent storage stability and can be applied with the most simple of methods. In no way can any cracking be observed. After a sufficient drying time, in the order of magnitude of 20 to 30 minutes, paint films with great hardness and good ground adhesion result. The drying time proved to be relatively independent of the temperature and the air humidity.

The preparation of the aqueous marking composition in accordance with the invention can be carried out such that first of all the low-viscosity paint component is mixed together from its components, including the drying-accelerated binder, which is supplied in containers sealed in an airtight manner, and this component is then mixed with the AC filler described. This high-viscosity composition can, as mentioned, be laid preferably with a drawing shoe. Alternatively, the finished marking composition can also be prepared in such a way that the ready-mixed low-viscosity paint component, which constitutes a sprayable composition, is sprayed in the direction of the roadway surface by means of a customary spray gun installed on a marking vehicle, and has added to it the particles of the AC filler before reaching the roadway surface; for this purpose the AC filler particles are projected with at least one filler gun into the jet leaving the paint spray gun. The filler particles can preferably be projected into the jet of paint from two sides with the aid of two filler guns, before this jet reaches the roadway surface. In this way the finished marking composition is not actually finished until immediately before the paint composition impinges on the roadway surface. The projection of particles into a jet of paint is known and is described, for example, in EP-B-0 280 102.

TABLE 1

| | 1<br>Beads<br>100–250 μ | 2<br>Beads<br>250–500 μ | 3<br>Quartz sand<br>100–400 μ | 4<br>Drying | 5<br>Cracks |
|---|---|---|---|---|---|
| 1) | 16.66% | 16.66% | 16.66% | 25 min. | none |
| 2) | 50.00% | — | — | 31 min. | none |
| 3) | — | 50.00% | — | 22 min. | none |
| 4) | — | — | 50.00% | 24 min. | none |
| 5)* | 16.66% | 16.66% | 16.66% | 21 min. | none |
| 6)** | 16.66% | 16.66% | 16.66% | 71 min. | none |

*AC filler particles were surface-treated.
**Sample with conventionally drying binder.

TABLE 2

| Type of material according to Table 1 | Layer thickness | | |
| --- | --- | --- | --- |
| | 1 mm | 2 mm | 3 mm |
| 1) | 07 min. | 17 min. | 25 min. |
| 2) | 09 min. | 19 min. | 31 min. |
| 3) | 09 min. | 22 min. | 33 min. |
| 4) | 07 min. | 17 min. | 24 min. |
| 5) | 06 min. | 16 min. | 21 min. |
| 6) | 20 min. | 43 min. | 71 min. |

What is claimed is:

1. An aqueous marking composition, comprising:
   (1) 40 to 60% by weight, based on the total weight of said marking composition,
      (a) drying-accelerated binder;
      (b) color pigments;
      (c) pulverulent fillers; and
      (d) additives; and
   (2) 60 to 40% by weight, based on the total weight of said marking composition, of coarse fillers whose particle diameter is at least 100 m, wherein said drying-accelerated binder comprises:
      (a) an anionically stabilized emulsion polymer;
      (b) a polyfunctional amine; and
      (c) a volatile amine,
   and wherein said aqueous marking composition has a solids content of 87 to 93% by weight, based on the total weight of said aqueous marking composition.

2. The aqueous marking composition according to claim 1, wherein the coarse fillers are in the range of from 45 to 55% by weight, based on the weight of the aqueous marking composition.

3. The aqueous marking composition according to claim 1, wherein the coarse fillers comprise glass beads or a mixture of glass beads and quartz sand.

4. The aqueous marking composition according to claim 1, wherein the coarse fillers comprise a mixture of 20 to 70 parts by weight of glass beads having a particle diameter in the range of from 100 m to 700 m and a remainder of quartz sand having a particle diameter in the range of from 100 m to 400 m, wherein the parts by weight are based on 100 parts by weight of the mixture.

5. The aqueous marking composition according to claim 1 or 4, wherein coarse fillers comprise approximately one third of glass beads with a particle diameter of 100 m to 250 m, approximately one third of glass beads with a particle diameter of 250 m to 600 m and approximately one third of quartz sand with a particle diameter of 100 m to 400 m.

6. The aqueous marking composition according to claim 1 comprising 12 to 24% by weight of the binder, 6 to 9% by weight of said color pigments, 20 to 27% by weight of the pulverulent fillers and about 2% by weight of the additives, based on the total weight of the aqueous marking composition.

7. The aqueous marking composition according to claim 3, wherein the coarse fillers are surface-treated and are coated with an organosilane as an adhesion promoter between the coarse fillers and the drying-accelerated binder.

8. The aqueous marking composition according to claim 1, wherein the composition is prepared by first mixing the drying-accelerated binder, the colored pigments, the pulverulent fillers and the additives to form a sprayable composition and then mixing therewith the coarse fillers.

9. The aqueous marking composition according to claim 1, wherein the particle diameter of the coarse fillers is in the range of from 100 m to 700 m.

10. The aqueous marking composition according to claim 1, wherein the anionically stabilized emulsion polymer comprises polymeric methacrylates.

11. The aqueous marking composition of claim 1, wherein said solids content is 89 to 91% by weight, based on the total weight of said aqueous marking composition.

12. The aqueous marking composition of claim 1, wherein said composition is prepared by first mixing said drying-accelerated binder, colored pigments, pulverulent fillers and said additives to form a sprayable composition and then mixing therewith said coarse fillers.

13. The aqueous marking composition of claim 11, wherein said sprayable composition and said coarse fillers are mixed before applying said aqueous marking composition on a surface.

14. The aqueous marking composition of claim 13, wherein said sprayable composition is sprayed in the direction of said surface with a spray gun and the coarse fillers are projected from at least one filler gun into the jet emerging from said spray gun, so that said aqueous marking composition is not formed until immediately prior to its impingement on said surface.

* * * * *